(12) United States Patent
Hofmeister et al.

(10) Patent No.: US 11,142,435 B2
(45) Date of Patent: Oct. 12, 2021

(54) METHOD FOR CRANE ASSEMBLY

(71) Applicant: LIEBHERR-WERK BIBERACH GMBH, Biberach an der Riss (DE)

(72) Inventors: Markus Hofmeister, Bad Waldsee (DE); Herrmann Schilling, Assmannshardt (DE)

(73) Assignee: LIEBHERR-WERK BIBERACH GMBH, Biberach an der Riss (DE)

( * ) Notice: Subject to any disclaimer, the term of this patent is extended or adjusted under 35 U.S.C. 154(b) by 594 days.

(21) Appl. No.: 16/065,092

(22) PCT Filed: Dec. 22, 2016

(86) PCT No.: PCT/EP2016/002173
§ 371 (c)(1),
(2) Date: Nov. 26, 2018

(87) PCT Pub. No.: WO2017/108191
PCT Pub. Date: Jun. 29, 2017

(65) Prior Publication Data
US 2019/0077639 A1    Mar. 14, 2019

(30) Foreign Application Priority Data
Dec. 23, 2015  (DE) .................... 10 2015 016 856.8

(51) Int. Cl.
*B66C 13/18* (2006.01)
*G06Q 50/08* (2012.01)
(Continued)

(52) U.S. Cl.
CPC .......... *B66C 13/18* (2013.01); *G06F 16/9535* (2019.01); *G06Q 10/06* (2013.01); *G06Q 50/08* (2013.01)

(58) Field of Classification Search
CPC ..... B66C 13/18; G06F 16/9535; G06Q 10/06; G06Q 50/08
See application file for complete search history.

(56) References Cited

U.S. PATENT DOCUMENTS

| 6,587,795 B2 * | 7/2003 | Schmid ................. B66C 23/905 212/278 |
| 7,194,324 B2 | 3/2007 | Sollner |

(Continued)

FOREIGN PATENT DOCUMENTS

| DE | 10129209 A1 | 6/2002 |
| DE | 10232659 A1 | 2/2004 |

(Continued)

OTHER PUBLICATIONS

Chu, C. et al., "Online Product Configuration in E-Commerce With 3D Web Viewing Technology," International Journal of Electronic Business Management, vol. 3, No. 3, Jan. 2005, 10 pages.

(Continued)

*Primary Examiner* — Ramsey Refai
(74) *Attorney, Agent, or Firm* — McCoy Russell LLP

(57) ABSTRACT

The invention relates to a method for crane configuration and crane assembly on the basis of an online portal, which holds at least one database with a plurality of standard crane configurations or is connected to the same, with an interface for the user access to the online portal, wherein a crane user virtually composes their individual crane configuration from a plurality of standard configurations and the individual crane configuration is stored on the online portal, wherein at least one further database of the online portal, or an externally connected database, holds assembly information about the stored individual crane configuration, the online portal (Continued)

filters the assembly information relevant in relation to the stored crane configuration and provides it for retrieval by an assembly team.

20 Claims, 5 Drawing Sheets

(51) Int. Cl.
    *G06Q 10/06*     (2012.01)
    *G06F 16/9535*     (2019.01)

(56) References Cited

U.S. PATENT DOCUMENTS

| | | | |
|---|---|---|---|
| 8,566,714 | B1 | 10/2013 | Stringer et al. |
| 8,777,027 | B2 | 7/2014 | Morath |
| 10,162,797 | B1* | 12/2018 | Culver .................. G09B 9/02 |
| 10,410,124 | B1* | 9/2019 | Zhou .................... G06N 5/04 |
| 2008/0004898 | A1* | 1/2008 | Hubler ............... B66C 23/905 |
| | | | 703/7 |
| 2010/0299172 | A1* | 11/2010 | Nottoli ................ G06Q 10/06 |
| | | | 705/7.18 |
| 2014/0344077 | A1* | 11/2014 | Smith ................. G06Q 30/018 |
| | | | 705/14.73 |
| 2015/0052060 | A1 | 2/2015 | Klasen et al. |
| 2015/0324940 | A1 | 11/2015 | Samson et al. |
| 2016/0035251 | A1* | 2/2016 | Delplace .............. G09B 19/003 |
| | | | 434/66 |

FOREIGN PATENT DOCUMENTS

| | | |
|---|---|---|
| DE | 202004008083 U1 | 11/2005 |
| DE | 102011083828 A1 | 4/2013 |
| WO | 02067151 A1 | 8/2002 |
| WO | 2004100026 A1 | 11/2004 |

OTHER PUBLICATIONS

"Produktkonfigurator," Wikipedia Website, Available Online at https://de.wikipedia.org/w/index.php?title=Produktkonfigurator&oldid=148943070, As last updated Dec. 10, 2015, Retrieved Oct. 26, 2016, 38 pages. (Submitted with Machine Translation).

ISA European Patent Office, International Search Report Issued in Application No. PCT/EP2016/002173, dated Apr. 7, 2017, WIPO, 6 pages.

* cited by examiner

METHOD FOR CRANE ASSEMBLY

CROSS-REFERENCE TO RELATED APPLICATION

The present application is a U.S. National Phase of International Patent Application Serial No. PCT/EP2016/002173, entitled "METHOD FOR CRANE ASSEMBLY," filed on Dec. 22, 2016. International Patent Application Serial No. PCT/EP2016/002173 claims priority to German Patent Application No. 10 2015 016 856.8, filed on Dec. 23, 2015. The entire contents of each of the abovementioned applications are hereby incorporated by reference in their entirety for all purposes.

TECHNICAL FIELD

The invention relates to a method for crane configuration and crane assembly of at least one crane.

BACKGROUND AND SUMMARY

Before the start of crane operations, the necessary crane configuration must be planned. Here, in particular the necessary information exchange between the interfaces construction site planner, customer, crane manufacturer, as well as assembly personnel is complex and time-intensive. Certain information is always only available to certain people, although it is often needed somewhere else, however. For a trouble-free and complete delivery and provision of the sub-components of a desired crane configuration, the crane configuration must first be communicated to the assembly team without errors. Especially with a large number of special configurations, which are increasingly requested on the part of the customer, an enormous number of different crane components is needed. The complexity of the construction, as well as the risk of mix-ups are increasing.

Viewed as of today, a crane is planned and constructed according to manufacturer specifications. The available and permitted standard configurations are shared with the customer by means of operating instructions or configuration programs. Special configurations require a static equilibrium check carried out by the manufacturer. Assembly information of the configured crane are handed over to the assembly team in the form of drawings. During and after the assembly has taken place, an inspection of the condition of the crane is very time-intensive. The assembly state of the crane is communicated via scaling data and input parameters.

An improved method is sought, in order to simplify and render safer the overall process of crane configuration with final assembly. What is desired is a network structured crane assembly and crane operation.

This object is achieved by means of the methods and portals described in the application.

A method for crane configuration and crane assembly on the basis of an online portal is proposed. This online portal includes at least one database with a plurality of standard crane configurations. Alternatively, the online portal can be connected to a corresponding external database. In addition, the online portal provides an interface for user access to the online portal. A user can, for example, access the online portal and the crane configurations provided there via the internet or a web browser. Alternatively, access to the online portal is also possible by means of local software packages, installable on a user PC. Basically, access is conceivable from any desired communications device, in particular a mobile device.

Through access to the online portal, a user of a crane can virtually compose their individual crane configuration for an upcoming construction order from among the plurality of standard configurations, and save the individual crane configuration on the online portal for later use. It is also conceivable that the user enters the job specifications (length of the boom, tower height, load, etc.), and the online portal suggests a standard configuration fulfilling the requirements. Furthermore, the online portal provides a further database, or a connection to a further external database, which holds a range of assembly information about different standard configurations for cranes. The online portal now selects, on the basis of the individual crane configurations made, the relevant assembly information from the database and makes it available for retrieval by an assembly team for the assembly of the crane.

The information exchange required between the provider of the crane or of possible crane components, the crane user as well as an assembly team for assembling and setting-up the crane does not occur manually or through separate information sources and channels, but instead in a centralized manner through the online portal made available. All required information can be retrieved in a decentralized manner from anywhere by anyone by access to the online portal. In addition, it is ensured that only the assembly information required in relation to the desired crane configuration is displayed to the assembly team. This prevents a wrong operation or wrong assembly of the crane due to false information.

According to an optional add-on of the online portal, it can be provided that the user of the crane can enter possible special configurations in addition to the standard configuration, and save the related crane configuration. If none of the available standard configurations fulfils the requirements, the online portal may submit a suggestion on a suitable special configuration. The online portal evaluates the user input, or accepted special configurations, and automatically generates a request to a crane manufacturer in regard to the desired special configuration of the crane user. This request is sent to the crane manufacturer, and consequently the online portal provides at least one interface to the system of the crane manufacturer. Now, the crane manufacturer may carry out a static equilibrium check of the desired special configuration and save the result regarding the respective individual crane configuration, again via the online portal. In the event that the desired special configuration is unproblematic in terms of structural safety, the crane configuration is approved, in particular made available for being called-up, by the online portal. In the event that the desired special configuration does not meet the structural requirements, it is conceivable that alternatives are suggested by the crane manufacturer or the online portal, which can be accepted or rejected by the user of the crane. If the suggestion is accepted, the alternative crane configuration can be stored in the system as an approved crane configuration.

It is also conceivable that one or multiple crane rental companies are linked via at least one interface of the online portal. Ideally, linking the crane rental companies is effected through a direct interface to their enterprise resource planning systems. As a result, the online portal gains indirect access to the current and planned availability required for the respective crane configuration. As a result, the online portal may perform an automated analysis, and determine whether all crane components required for the individual crane configuration are available with at least one crane manufacturer. As needed, it may be provided that an offer for a desired crane configuration is automatically requested from at least one crane rental company, depending on the availability, and can subsequently automatically be submitted to the user of the crane via the online portal. In this context, it is also possible that a subsequent confirmation of an order by the customer is also made through the online portal.

According to another advantageous configuration, it is conceivable that the assembly team can check the availability of one or multiple crane components with at least one crane rental company and/or crane manufacturer through the online portal. For example, it may turn out, during the assembly, that additional crane components are required, or that a minor change of the crane configuration is needed. In this case, it is conceivable that the assembly team has access to the online portal in order to check availability for potential crane components. It is also conceivable that an order can be placed directly from the construction site through an external access to the online portal. Furthermore, it is conceivable to call-up corresponding delivery dates or delivery periods through the online portal.

The assembly information required for the assembly include operating and/or assembly instructions of the crane, for example. This includes detailed instructions and documents on the respective crane components. Furthermore, it is possible to provide an online assistance system through the online portal or to offer it for download. Such an assistance system provides a step-by-step instruction of the required assembly processes. For example, this includes possibly available video tutorials, or a step-by-step visualization of the assembly steps.

According to a particularly preferred configuration, the at least one crane control of the crane composed according to the stored crane configuration has access to the online portal via a communication interface. It is also conceivable, for example, that the online portal provides control parameters relevant to the stored individual crane configuration in an automated and filtered manner, so that these parameters can be downloaded to the crane directly through the linked crane control. As a result, a crane control need not be manually programmed after the crane assembly, but instead, this step can occur in an automated manner through linking the crane control to the online portal. In addition, the assembly team, or the crane operator, does not have to search for the necessary control parameters in a very time-consuming manner, because this previous step occurs in the online portal in an automated manner.

The control parameters transmitted or provided to the crane control preferably contain information on the bearing load curve of the crane (current radius, ballasting, bearing load), information on the lifting unit, rotating mechanism, trolley (speeds, acceleration and deceleration ramps, engine data), as well as information specific to the construction site (area of restricted operability, approval of the weathervane function only in a safe area). This may also include data on the current space conditions on the construction site, maximum connection power, ground conditions for checking the stability, as well as other environmental factors such as wind velocity, temperature, pressure conditions, available interfaces and functions on the construction site control station, etc.

An early integration of the crane control into the ongoing assembly process provides the advantage, for example, that the current set-up state of the crane can be monitored during the assembly process. Monitoring is effected based upon integral electronic identification features (ID) of the crane components, which can be detected by the crane control electronically, in particular wireless, inductively or via capacitive sensing. As a result, the crane control obtains information on which crane components are already present and which of them are already finally assembled, in particular.

According to a preferred embodiment of the invention, this information about the current set-up state is transmitted from the crane control to the online portal, where a plausibility check is carried out based upon the received information through a matching of the detected crane components and the stored individual crane configuration. As a result, missing crane components or crane components which are faulty or wrong with respect to the desired crane configuration can be detected. If a missing or faulty crane component is detected, a suitable delivery order to at least one crane manufacturer or crane rental company can be automatically generated and transmitted tough the online portal.

It is also conceivable to determine, whether the installed crane components are actually genuine and bear up against a respective verification, through the detection of the electronic identification features. Through the use of an individual identifier for the electronic identification features, these are forgery-proof and plagiarism can be detected internally in the system. There is a possibility to generate corresponding alerts on the part of the crane control or the online portal in order to inform the crane operator on the detection of plagiarism.

The use of electronic identification features allows further application possibilities. An automatic detection of the operating time of a crane component based upon the identification feature is conceivable. The operating times can be readily managed in the online portal, and notifications on necessary maintenance work or also inspections of the crane components can be generated and output, as required. Furthermore, this allows invoicing on an operating time basis. Operating periods are available for retrieval in the online portal, but they can also be automatically forwarded to the crane rental company.

The transmission of information relevant to the crane configuration can not only occur to the crane control or to the assembly team, but also to machines or tools possibly connected to the online portal, in particular tools required for crane assembly or common in crane operation. For example, it is conceivable that such tools include a proper communication module in order to communicate with the online portal. Just as well, an indirect communication through one or multiple interposed gateways is conceivable. The machines and/or tools can call-up information relevant to the assembly from the online portal, such as required tightening moments for hydraulic torque wrenches or test values or device settings for measuring equipment.

It is desirable for the communication with the online portal that the crane provides a corresponding access point, which allows a direct connection of the crane to the online portal. Likewise, tools or other communication means of the assembly staff can use the access point of the crane.

Furthermore, it is desirable to provide authorization means at the crane for the authorized access of individual users, in particular team members of the assembly team, to the online portal. Besides the controlled access to the online portal, this provides the possibility to have offers of the online portals be tailored to the needs of the users. Configuration parameters of the crane can be filtered in a user-specific manner through the online portal, and be made available. For example, an individual team member of the assembly team only has restricted access to all configuration parameters relevant to the crane configuration, while other members are to have extended access. Besides the pure access, modification of possible crane parameters can be configured depending on the individual user.

It is also conceivable that individual control commands can be enabled specifically for the crane user. One example is the control of the heater inside the crane operator's cab, which can be activated by the members of the assembly team, i.e. it is enabled for these types of users. The authorization of the individual members of the assembly team can also be used to record the hours of work of the assembly team and to transmit them to the online portal.

Furthermore, it is conceivable that at least one mobile communication device, which includes positioning means, for example GPS, can be connected to the crane and/or to the online portal. This makes it possible that the crane user, before starting crane operation, walks the crane operation area with the communication device, and the positioning data detected by the communication device are transmitted to the online portal. This allows the automatic determination of the potential area of restricted operability of the crane, and to consider it for the necessary crane configuration and/or crane control within the online portal.

Besides the method according to the invention, the present invention also relates to an online portal for crane configuration and crane assembly of at least one crane, wherein the online portal is characterized by means that allow performing the method according to the invention and an advantageous configuration of the method according to the invention, respectively. Thus, the online portal is characterized by the same advantages and features as have already been explained by means of the method according to the invention. Therefore, a repetitive description can be omitted.

Further advantages and features of the invention will be explained in greater detail hereinafter by means of an exemplary embodiment illustrated in the Figures.

DETAILED DESCRIPTION

First, details on the method or the online portal according to the invention will be described based upon the crane assembly and crane operation, respectively.

Crane Assembly

Figure 1:
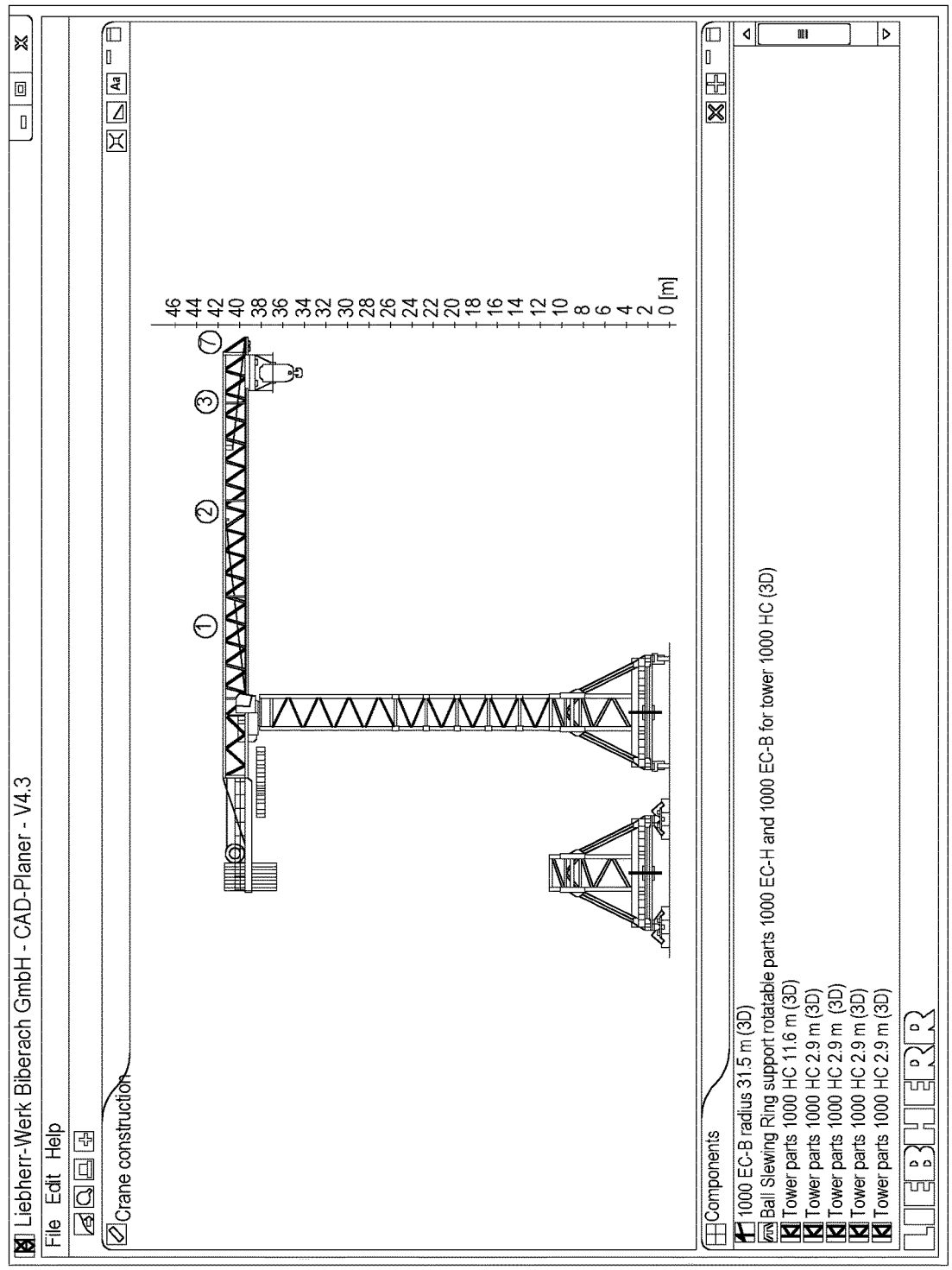
FIG. 1 shows a screen shot of the online portal according to the invention.

It is possible to compose the desired crane configuration via an online portal 10 or a software on the computer of the customer 1. A screenshot of the configuration environment of the online portal 10 is illustrated in FIG. 1 by way of example. The customer 1 gets graphic support in the crane configuration. The customer is thereby offered all available standard configurations. The customer can compose the crane depending on their needs, and after that transmit the CAD data of the crane construction.

Figure 2:
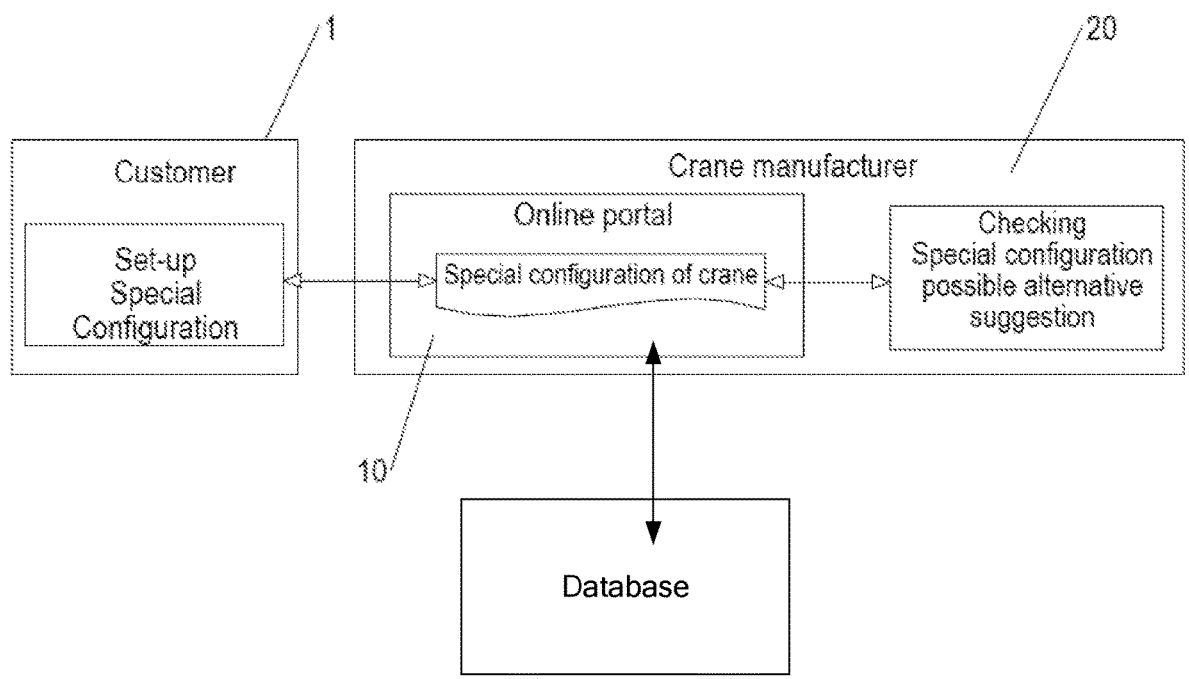
FIG. 2 shows a descriptive schematic block diagram of the online portal according to the invention.
Figure 3:
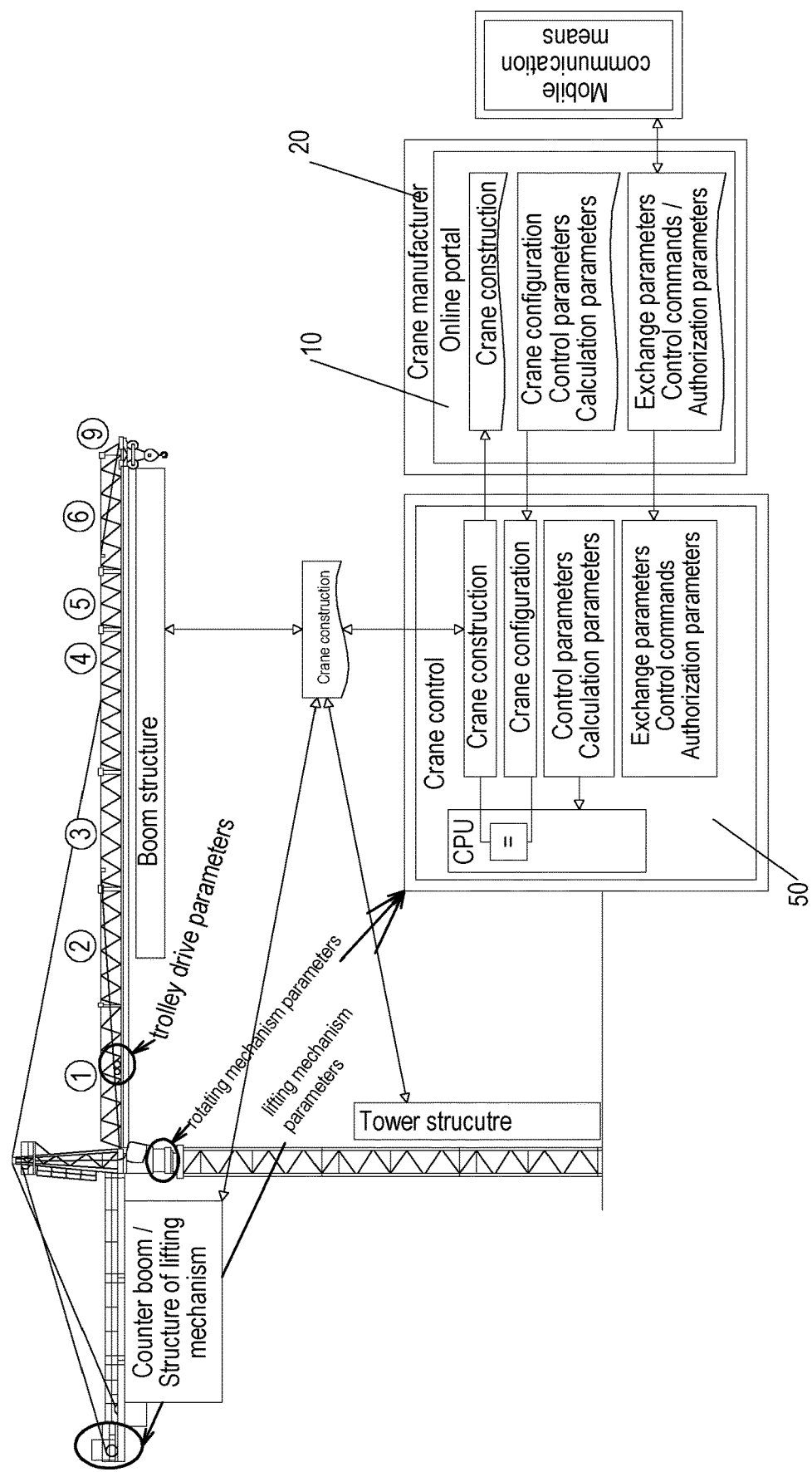
FIG. 3 shows a schematic representation of the interface between online portal and crane control.

In the event that a special configuration of the crane construction is required, this provides the customer 1 with the option to send it to the crane manufacturer 20 directly via the online portal 10, as schematically indicated in FIG. 2. A static equilibrium check of the special configuration is carried out at the crane manufacturer 20 then. In the case that the configuration cannot be implemented, the crane manufacturer 20 can submit an alternative suggestion via the online portal 10.

Crane rental companies 30 can manage their device and component capacities in the online portal 10. There is also an option, via an online portal interface to the ERP system 31 of the crane rental company 30, to detect the availability of the components online. This makes it possible that the assembly staff requests the availability of the components, as well as can order required components (e.g. a tower segment) to the construction site or make a reservation for them. Delivery dates as well as delivery status of components on their way to the construction site can be managed and retrieved via the portal.

Crane rental companies 30 can publish their fleet in the online portal 10. This makes it possible that the customer 1 gets suggestions of a selection of crane rental companies 30 that have the desired crane constellation already on stock. An automated offer and order process through the entire crane configuration as well as missing components with the crane manufacturer 20 is made possible to the crane rental company 30 via the portal 10. Necessary maintenance dates as well as notifications about the relevant components are managed in the online portal 10 and communicated to the executing party. Test values as well as test data are recorded and managed in the online portal 10. In addition, notifications as well as conditions (e.g. damaged, delivery) of individual components can be saved online. There is an option to define distinct conditions, in order to achieve a more flexible management for all crane rental companies.

The crane configuration determined by the crane rental company 30 and approved by the manufacturer 20 is stored in the online portal 10. Via mobile and stationary communication means, the assembly staff 40 can retrieve information about the crane configuration as well as the assembly. E-learning and videos simulate and explain the crane assembly and point out to dangerous situations. The information available to the user is being adapted to the crane configuration, which is why the whole situation is kept clear. An assistance system guides the entire assembly team 40 through the crane assembly via modern communication means. The crane-specific access occurs through inputting the serial number as well as codes, which can be scanned by mobile communication means.

A WLAN access point in the crane also allows access to the online portal 10 as well as to the crane control 50. All required parameters, such as scaling data, current radius, parameters of bus users can be retrieved and changed via the online portal or via the WLAN access point. Prior to constructing the crane, a tool list can be transmitted from the online portal.

Tools (e.g. electric screwdrivers, hydraulic screwdrivers) may also receive their parameters from the online portal 10 (e.g. tightening moments, test pressure) through a link (WLAN, UMTS). Likewise, the obtained parameters are verified by the tool and also stored in the online portal 10. As a result, after and during the assembly, one can understand which assembly steps have already been carried out and which moment was used to tighten screws, for example.

The crane control 50 is linked with the online portal 10. As a result, the crane control 50 is capable of monitoring the construction of the crane as well as of implementing the interface to the online portal 10. Codes in the components, which can be detected electronically, via radio, inductively or sensed capacitively, allow the detection of the current state of the crane configuration. Missing components are displayed and can be output or even directly ordered at the crane rental company 30 or even at the crane manufacturer 20. The current state of the crane configuration is also stored in the portal. The correctness and authenticity (plagiarism?) is checked simultaneously with the detection of the components. Due to the online management of the components, the crane rental company 30 is informed, when planning an operation, about which components must be checked and approved (e.g. Technical Surveillance Body) prior, during and after the crane operation. The assembly staff 40 can add notes or comments to components or assembly steps.

During or at the end of the assembly, a certified assembly report including certified test values can be output. This may simplify the approval by certain institutions. The climbing system of the crane is also connected to the crane control. The climbing system forwards information about the construction to the assembly staff 40 and also checks the installed components for correctness as well as authenticity.

Crane Operation

Through the link between crane control 50 to the online portal 10, an exchange of relevant parameters is rendered possible. As a result, a central management of control parameters depending on the crane configuration is achieved. Parameters for the crane control 50 are stored for the crane configuration stored in the online portal 10. In the crane control 50, only one crane configuration is stored, which is assigned to the crane control 50 via the online portal 10. The management is effected through the serial number. The parameters contain, for example, information about the bearing load curve (radius, bearing load), information about the lifting unit, rotary mechanism, trolley (speeds, acceleration and deceleration ramps, motor data) as well as construction site-specific information (maximum connection power, area of restricted operability, approval or the weathervane function only in a safe area).

Based upon the parameters, also a plausibility check of the scaling data and configuration data can be effected. For example, the fact that a wrong lifting unit has been installed will be detected. Likewise, configuration-dependent computation parameters such as parameters for dynamics compensation of the steel structure are communicated to the crane control. These parameters can be updated and checked by the crane manufacturer 20, whereby continuous optimizations of the crane control 50 can be performed. Just as well, wrong parameters are prevented from being entered. There is also the option for a complete software update of the crane control 50. This is communicated to the crane assembly staff and operators 40 if an update is available.

The operating- and assembling staff 40 can authenticate themselves at the crane. This occurs through entering username and password, or by inserting an authorization card or by mobile communications means. Certain parameters can be approved for changes via user groups, e.g. operator, mechanic. For example, a mechanic can adjust the time of the central lubrication intervals, but an operator can only adjust the crane control to their requirements in the approved range. Manipulation can thus be ruled out. The display elements (menu in displays, online portal) are being adapted to the groups. This also allows activating and deactivating certain functions.

Due to the authorization, hours of work of the personnel as well as machine operating periods can be detected or computed. These can be transmitted via interfaces to the individual management software (ERP 31, personnel management) to the crane rental companies 30.

Through the online portal 10, approved control commands can be issued to the crane control 50. This makes is possible to place certain control commands through mobile communication means. For example, the time control of the cab heating system can be set, or areas of restricted operability are walked with a mobile communication means includes a GPS receiver, and the GPS coordinates are directly stored in the online portal 10. The online portal 10 forwards the areas of restricted operability directly to the crane control 50. There is also the option to communicate them directly to the crane control 50 via the WLAN access point at the crane. Likewise, the crane can be called via a mobile communication means and its GPS coordinates. In other words, the coordinates of the mobile communication means are communicated to the crane control 50, and this controls the crane hook directly to this GPS position. Likewise, approved drive commands can be made via a mobile communication means.

Furthermore, special optional crane functions can be unblocked via the online portal, possibly only in a time-limited manner.

Figure 4A:
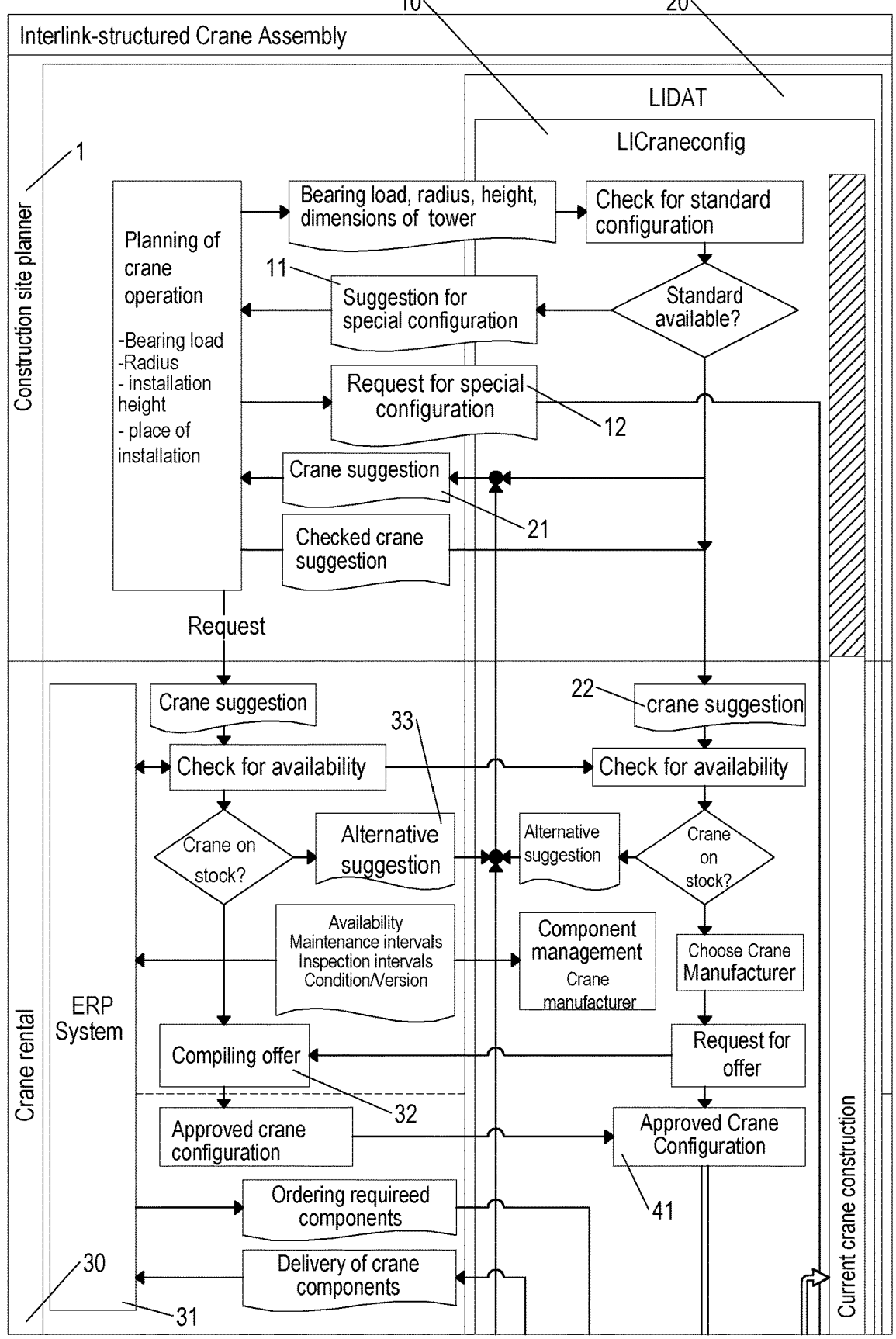
FIGS. 4A and B show an exemplary flow chart for the process for crane configuration and crane assembly, according to the invention, of a crane.
Figure 4B:
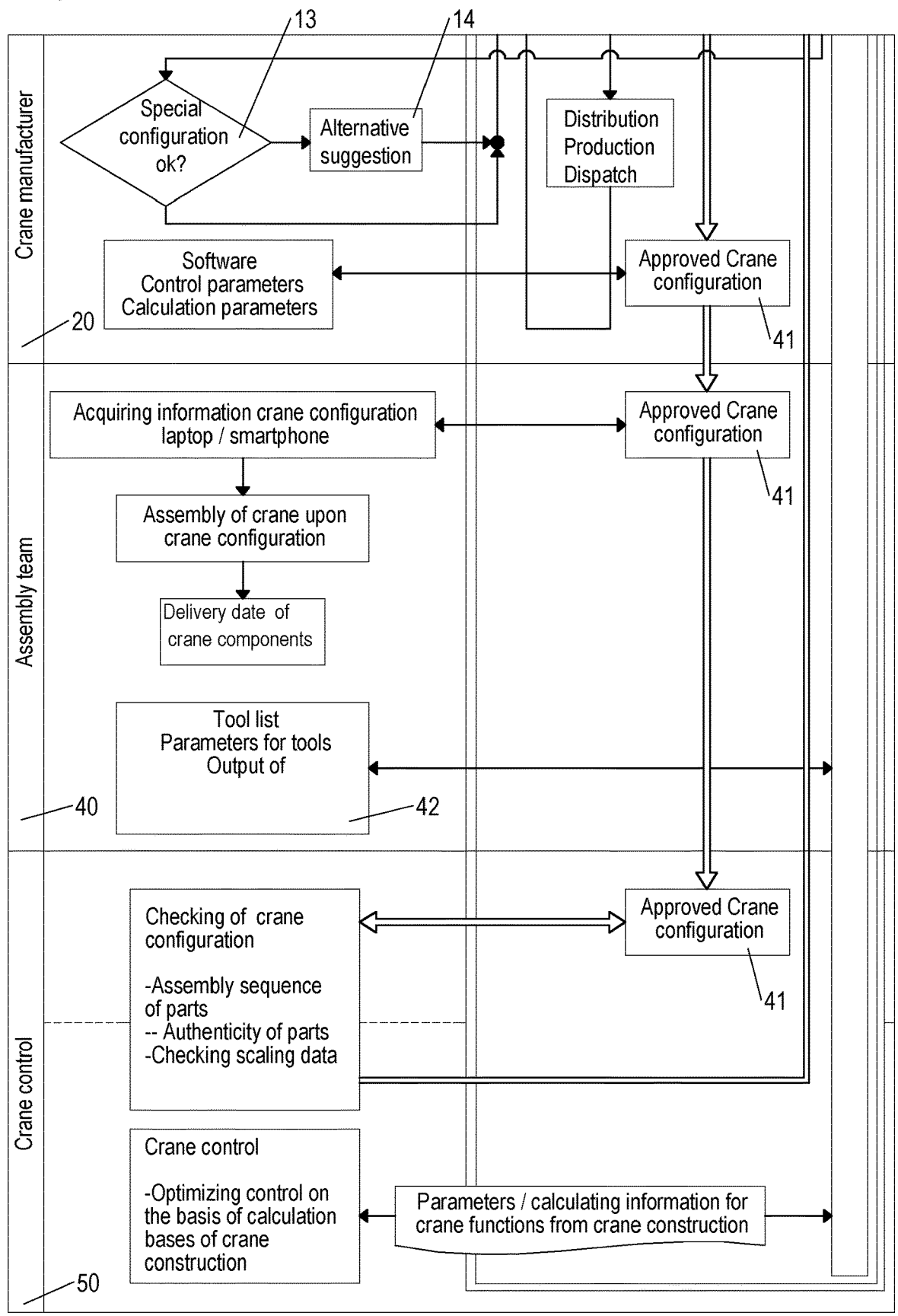

Now, an exemplary illustration of a possible course of a crane configuration of an assembly process is to be explained by means of the block diagram of FIGS. 4A and B. The online portal 10, referred to as "LiCraneconfig" can be discerned on the right side. It can be embedded, for example, into an environment of the crane manufacturer 20, such as the "LIDAT system" for general fleet management. Individual communication components are shown on the left side, which communicate with the online portal 10 through corresponding interfaces.

In the first step, the crane user or the site planner 101 starts entering the required crane configuration via the online portal 10. Here, in particular information such as bearing load, radius, height, dimensions of the tower or of the place of installation are transmitted to the online portal 10. Now, the online portal 10 automatically checks whether a standard configuration can be used with the desired operating parameters. In the case that a standard configuration is possible for the operating requirements, the online portal 10 submits a crane suggestion 21 to the site planner 101, who can accept it. Based upon the accepted crane suggestion 22, availability of the crane is checked with the crane rental companies 20.

In the case that the requirements can not be met by any available standard configuration, the online portal 10 automatically generates a suggestion 11 for a special configuration. This special configuration may thereupon be confirmed by the site planner 101, whereupon the online portal 10 sends a corresponding request to the crane manufacturer 20. The special configuration 12 is then subjected to a static equilibrium check by the crane manufacturer 20 (block 13) and sent to the user as a crane suggestion 21, or instead, an alternative suggestion 14 is re-transmitted to the online portal 10. If one of these crane suggestions is accepted by the site planner 101, the configuration 22 is checked for availability.

In particular, it is checked whether the required components for the crane suggestion 21 are available with at least one crane rental company 30. This check can occur via an interface with the crane rental company 30, or a direct connection to an ERP system 31. In the case that the crane including the required components according to crane configuration 22 is available, a corresponding offer 32 can be requested and generated. In the case that the respective crane components are not completely available, a suggestion for an alternative offer 33 is made, which is sent to the site planner 1 as a crane suggestion 21. If, finally, an available crane configuration is found, the individual crane configuration 41 can be approved and be stored in the online portal 10 to be retrievable there after a corresponding confirmation of the offer.

For the approved crane configuration 41, the component management 35 is activated at the same time, which provides information on availability, maintenance intervals, inspection intervals, and state/version of the employed crane components for the individual crane configuration in the online portal 10. Along with the concluded rental contract, the order of the required components is initiated in an automated manner, information about the delivery of the ordered components can be called-up via the online portal 10.

The approved crane configuration 41 is located as to be callable from the online portal 10 at any time, so that an assembly team 40 obtains direct access to the crane configuration 41 on the one hand as well as the relevant assembly instructions via communications means such as laptops or smartphones on the other hand. In addition, a list of required tools 42 and involved parameters for the configuration of the tools is generated and provided. In addition, test protocols for the final inspection of the assembled crane as well as required maintenance intervals of the installed crane components are communicated.

The crane control 50 can be connected to the online portal 10 in a communicating manner already during the assembly of the crane. The crane control 50 performs a check of the crane configuration already during the assembly, in that the individual installed crane components are detected through electronic identification features and the current state is communicated to the online portal 10. As a result, the order of assembly of the crane components can be understood later. In addition, it is possible to determine the authenticity of the components by means of the identification features, and to perform a verification of the scaling data. The result is transmitted to the online portal 10, where the current crane construction 41 is documented and stored.

In a final step, the online portal 10 generates an overview of the required control parameters for the crane control 50 and starts transmitting them to the crane control 50. An optimization of the crane control 50 can be made at any time based upon the computation base of the crane configuration.

The invention claimed is:

1. A method for crane configuration and crane assembly on the basis of an online portal, the online portal holds at least one database with a plurality of standard crane configurations or which is connected to the at least one database, and with an interface for user access to the online portal,
    a user of the online portal for a crane configuration virtually composes an individual crane configuration from the plurality of standard crane configurations, and the individual crane configuration is stored on the online portal, and
    at least one further database of the online portal, or an externally linked database, holds assembly information about the individual crane configuration that is stored, wherein the online portal filters assembly information relevant in regard to the individual crane configuration that is stored, and provides the assembly information for retrieval by an assembly team,
    installing crane components based on the assembly information, and generating an alert responsive to detecting crane component plagiarism via verification of the installed crane components.

2. The method according to claim 1, wherein a crane operator can compose one or multiple special configurations for a special crane configuration, and wherein the one or more special configurations is transmitted to an entity in an automated manner through the online portal for a static equilibrium check of the one or more special configurations.

3. The method according to claim 1, wherein one or multiple entities are linked via an interface of the online portal, and a check is performed for a stored crane configuration as to whether a crane having a desired crane configuration is available with at least the one or multiple entities, wherein an offer for the desired crane configuration is generated by the one or multiple entities in an automated manner, and submitted to the user via the online portal.

4. The method according to claim 1, wherein the assembly team can check an availability of one or multiple crane components with at least one crane rental company and/or crane manufacturer, and/or can order required crane components to a construction site through the online portal in an automated manner, and/or request respective delivery dates and/or delivery periods via the online portal.

5. The method according to claim 1, wherein the assembly information provided via the online portal includes operating instructions and/or assembly instructions and/or represents an assistance system for a guided assembly process.

6. The method according to claim 1, wherein at least one crane control of a crane composed in accordance with the individual crane configuration that is stored has access to the online portal via a communication interface, and the online portal holds control parameters relevant to the stored individual crane configuration that is stored, which are retrieved by the crane control of the crane.

7. The method according to claim 6, wherein the control parameters include information on a bearing load curve of the crane, information on a lifting unit, rotary mechanism, trolley, as well as site-specific information.

8. The method according to claim 6, wherein the crane control monitors a current set-up state of the crane which can be electronically detected by the crane control and forwards the current state to the online portal.

9. The method according to claim 8, wherein the crane control detects operating periods of the crane components and/or checks their authenticity and transmits corresponding results to the online portal, wherein the online portal manages the operating periods and generates and outputs notes about required maintenance and/or checks of the crane components.

10. The method according to claim 1, wherein one or multiple assembly tools or tools for operation of the crane can access the online portal via a communication module, in order to request required information for operating the one or multiple assembly tools or tools in regard to the crane configuration.

11. The method according to claim 1, wherein a crane operator and/or the assembly team can authenticate themselves at the online portal via authorization means of the crane, wherein operation of the crane is enabled responsive to authentication of the crane operator and/or the assembly team, wherein the online portal filters and provides configuration parameters for the operation of the crane in a user-specific manner, and/or approves a user-individual modification of possible crane parameters and allows transmission of the configuration parameters for the operation of the crane and/or the approved user-individual modification of possible crane parameters to the crane control, and/or approves control commands for the operation of the crane in a user-specific manner and/or detects hours of work of the assembly team based upon authentication times and forwards the approved control commands for the operation of the crane and/or the hours of work of the assembly team detected to an entity.

12. The method according to claim 11, wherein a mobile communication device having positioning means can be connected to the crane and/or the online portal, wherein the mobile communication device is moved through a crane working region and positioning data detected by the mobile communication device is transmitted to the online portal, in order to determine a possible area of restricted operability of the crane and consider the possible area of restricted operability for the crane configuration and/or crane control.

13. An online portal for crane configuration and crane assembly of at least one crane: the portal holds at least one database with a plurality of standard crane configurations or which is connected to this database, and with an interface for user access to the online portal,
  a user of the online portal for a crane configuration virtually composes an individual crane configuration from the plurality of standard configurations, and the individual crane configuration is stored on the online portal,
  at least one further database of the online portal, or an externally linked database, holds assembly information about the individual crane configuration that is stored, the online portal filters the assembly information relevant in regard to the individual crane configuration that is stored, and provides the assembly information for retrieval by an assembly team, and
  installing crane components based on the assembly information, and generating an alert responsive to detecting crane component plagiarism via verification of the installed crane components.

14. The online portal of claim 13, wherein one or multiple entities are linked via an interface of the online portal by integrating an ERP system of the entities, and a check is performed for a stored crane configuration to determine whether a crane having a desired crane configuration is available with the one or more multiple entities, wherein an offer for the desired crane configuration is generated by the one or multiple entities in an automated manner and submitted to the user via the online portal responsive to determining the desired crane configuration is available, and an order confirmation occurs through the online portal.

15. The online portal of claim 13, wherein the assembly team can check the availability of one or multiple crane components with at least one entity, order required crane components to a construction site through the online portal in an automated manner, and request respective delivery dates and delivery periods via the online portal.

16. The online portal of claim 13, wherein assembly information provided via the online portal includes operating instructions, assembly instructions, and represents an assistance system for a guided assembly process.

17. The online portal of claim 13, wherein a crane control monitors a current set-up state of the crane based upon electronic identification features of the crane components and provides a display based on the current set-up state, where the current set-up state can be electronically detected by the crane control and forwarded to the online portal, including a plausibility check of the installed crane components performed via the online portal, wherein missing crane components are included in the display, and wherein responsive to detecting missing or faulty crane components a delivery order to at least one entity is generated and transmitted to the at least one entity.

18. The online portal of claim 13, wherein a crane control detects operating periods of crane components and checks their authenticity and transmits the results to the online portal, wherein the online portal manages the operating periods and, generates and outputs notes about required maintenance and checks of the crane components.

19. The online portal of claim 13, wherein the crane operator and the assembly team can authenticate themselves at the online portal via authorization means of the crane, wherein the online portal filters and provides configuration parameters of the crane in a user-specific manner, and approves a user-individual modification of possible crane parameters and allows transmission of the configuration parameters of the crane and the user-individual modification of the possible crane parameters to a crane control, and approves control commands for the crane in a user-specific manner and detects hours of work of the assembly team based upon authentication times and forwards the control commands for the crane and the hours of work of the assembly team to an entity.

20. The online portal of claim 13, a mobile communication device having positioning means can be connected to the crane and the online portal, the communication device moved through a crane working region and positioning data detected by the communication device is transmitted to the online portal, in order to determine the possible area of restricted operability of the crane and consider the possible area of restricted operability of the crane for the crane configuration and crane control.

* * * * *